US009463709B2

(12) United States Patent
Takeda et al.

(10) Patent No.: US 9,463,709 B2
(45) Date of Patent: Oct. 11, 2016

(54) VEHICLE

(71) Applicant: TOYOTA JIDOSHA KABUSHIKI KAISHA, Toyota-shi, Aichi-ken (JP)

(72) Inventors: Kazuhisa Takeda, Toyota (JP); Hiroki Tashiro, Aichi-ken (JP); Hideaki Oka, Nagakute (JP); Shuji Tomura, Nagakute (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/805,950

(22) Filed: Jul. 22, 2015

(65) Prior Publication Data
US 2016/0023570 A1   Jan. 28, 2016

(30) Foreign Application Priority Data
Jul. 23, 2014  (JP) ................................. 2014-150260

(51) Int. Cl.
| *B60L 11/18* | (2006.01) |
| *B60L 11/04* | (2006.01) |
| *B60T 7/04* | (2006.01) |
| *B60L 7/12* | (2006.01) |
| *G05G 1/30* | (2008.04) |

(52) U.S. Cl.
CPC .............. *B60L 11/1864* (2013.01); *B60L 7/12* (2013.01); *B60L 11/04* (2013.01); *B60L 11/1859* (2013.01); *B60T 7/042* (2013.01); *G05G 1/30* (2013.01)

(58) Field of Classification Search
CPC ....... B60L 11/1864; B60L 11/04; B60L 7/12; B60L 11/1859; G05G 1/30; B60T 7/042
See application file for complete search history.

(56) References Cited

U.S. PATENT DOCUMENTS

2010/0241376 A1   9/2010  Kikuchi et al.
2015/0236381 A1*  8/2015  Mita ................ H01M 10/0567
                                                   429/200

FOREIGN PATENT DOCUMENTS

JP       2009-123435 A     6/2009

* cited by examiner

*Primary Examiner* — Rodney Butler
(74) *Attorney, Agent, or Firm* — Sughrue Mion, PLLC

(57) ABSTRACT

A vehicle includes a controller. When a brake operation amount has increased, the controller calculates an estimated input value at the time when a main battery is charged in response to an increase in the brake operation amount, on the basis of a current speed and an amount of increase in brake operation amount. The controller discharges the main battery for charging an auxiliary battery at a current value that is calculated on the basis of the estimated input value by controlling an operation of a DC-DC converter before charging the main battery in response to an increase in the brake operation amount. Thus, it is possible to cancel a bias of salt concentration that is developed during charging by a bias of salt concentration that is developed during discharging, so, after the main battery has been charged, it is possible to suppress development of a bias of the salt concentration and suppress an increase in the internal resistance value of the main battery.

6 Claims, 11 Drawing Sheets

VEHICLE

INCORPORATION BY REFERENCE

The disclosure of Japanese Patent Application No. 2014-150260 filed on Jul. 23, 2014 including the specification, drawings and abstract is incorporated herein by reference in its entirety.

BACKGROUND OF THE INVENTION

1. Field of the Invention

The invention relates to a vehicle that is able to suppress an increase in the internal resistance value of a battery resulting from a bias of salt concentration in the battery when the battery has been discharged or charged in response to an operation of an accelerator pedal or a brake pedal.

2. Description of Related Art

In Japanese Patent Application Publication No. 2009-123435 (JP 2009-123435 A), an evaluation value for the degradation of a secondary battery due to a large-current discharge is calculated from a discharge current value, or the like, and, when the evaluation value is larger than a target value, a discharge power limit value is reduced below the maximum value. Through such control, an advance of the degradation of the secondary battery due to high-rate discharging is suppressed. The degradation of the secondary battery is determined by the internal resistance value of the secondary battery.

SUMMARY OF THE INVENTION

In JP 2009-123435 A, after the degradation of the secondary battery due to high-rate discharging has advanced, a further advance of the degradation of the secondary battery is suppressed by reducing the discharge power limit value below the maximum value. Therefore, the technique described in JP 2009-123435 A is not able to suppress occurrence of the degradation of the secondary battery due to high-rate discharging. In terms of suppressing the degradation of the secondary battery, not causing occurrence of the degradation of the secondary battery is more desirable than suppressing an advance of the degradation of the secondary battery.

A first aspect of the invention provides a vehicle. The vehicle includes a main battery, a motor generator, a brake pedal, a brake operation amount sensor, an auxiliary battery, a DC-DC converter, and a controller. The main battery includes a nonaqueous electrolyte secondary battery. The motor generator is configured to generate energy for propelling the vehicle upon reception of electric power output from the main battery, and also generate electric power during braking of the vehicle and then output the generated electric power to the main battery. The brake operation amount sensor is configured to detect a brake operation amount. The brake operation amount is an operation amount of the brake pedal. The speed sensor is configured to detect a speed of the vehicle. The auxiliary battery is configured to supply electric power to an auxiliary. The DC-DC converter is configured to step down an output voltage of the main battery and then output electric power having the stepped-down voltage to the auxiliary battery. The controller is configured to, when the brake operation amount has increased, calculate an estimated input value on the basis of a current speed detected by the speed sensor and an amount of increase in the brake operation amount. The controller is configured to control an operation of the DC-DC converter before charging the main battery in response to an increase in the brake operation amount. The controller is configured to calculate a current value on the basis of the estimated input value, and discharge the main battery for charging the auxiliary battery at the current value. The estimated input value is an input value at the time when the main battery is charged with electric power generated by the motor generator in response to an increase in the brake operation amount.

A second aspect of the invention provides a vehicle. The vehicle includes a main battery, a motor generator, a brake pedal, a brake operation amount sensor, an auxiliary battery, a DC-DC converter, and a controller. The main battery includes a nonaqueous electrolyte secondary battery. The motor generator is configured to generate energy for propelling the vehicle upon reception of electric power output from the main battery, and also generate electric power during braking of the vehicle and then output the generated electric power to the main battery. The brake operation amount sensor is configured to detect a brake operation amount. The brake operation amount is an operation amount of the brake pedal. The speed sensor is configured to detect a speed of the vehicle. The auxiliary battery is configured to supply electric power to an auxiliary. The DC-DC converter is configured to step down an output voltage of the main battery and then output electric power having the stepped-down voltage to the auxiliary battery. The controller is configured to, when the brake operation amount has increased, calculate an estimated input value on the basis of a current speed detected by the speed sensor and an amount of increase in the brake operation amount. The controller is configured to, when the estimated input value is larger than the input threshold, control an operation of the DC-DC converter before the main battery is charged in response to an increase in the brake operation amount, The controller is configured to calculate a current value on the basis of a difference between the estimated input value and the input threshold, and discharge the main battery for charging the auxiliary battery at the current value. The estimated input value is an input value at the time when the main battery is charged with electric power generated by the motor generator in response to an increase in the brake operation amount.

In the above aspect, the controller may be configured to, when the estimated input value is smaller than or equal to the input threshold, charge the main battery in response to an increase in the brake operation amount without discharging the main battery for charging the auxiliary battery.

A third aspect of the invention provides a vehicle. The vehicle includes a main battery, an accelerator pedal, an accelerator operation amount sensor, a speed sensor, an auxiliary battery, a DC-DC converter, and a controller. The main battery includes a nonaqueous electrolyte secondary battery. The main battery is configured to output energy for propelling the vehicle. The accelerator operation amount sensor is configured to detect an accelerator operation amount. The accelerator operation amount is an operation amount of the accelerator pedal. The speed sensor is configured to detect a speed of the vehicle. The auxiliary battery is configured to supply electric power to an auxiliary. The DC-DC converter is configured to step down an output voltage of the main battery and then output electric power having the stepped-down voltage to the auxiliary battery, and step up an output voltage of the auxiliary battery and then output electric power having the stepped-up voltage to the main battery. The controller is configured to, when the accelerator operation amount has increased, calculate an estimated output value on the basis of a current speed detected by the speed sensor and an amount of increase in the accelerator operation amount. The controller is configured to control an operation of the DC-DC converter before discharging the main battery in response to an increase in the accelerator operation amount. The controller is configured to calculate a current value on the basis of the estimated output value, and charge the main battery with electric power output from the auxiliary battery at the current value. The estimated output value is an output value at the time when the main battery is discharged in response to an increase in the accelerator operation amount.

A fourth aspect of the invention provides a vehicle. The vehicle includes a main battery, an accelerator pedal, an accelerator operation amount sensor, a speed sensor, an auxiliary battery, a DC-DC converter, and a controller. The main battery includes a nonaqueous electrolyte secondary battery. The main battery is configured to output energy for propelling the vehicle. The accelerator operation amount sensor is configured to detect an accelerator operation amount. The accelerator operation amount is an operation amount of the accelerator pedal. The speed sensor is configured to detect a speed of the vehicle. The auxiliary battery is configured to supply electric power to an auxiliary. The DC-DC converter is configured to step down an output voltage of the main battery and then output electric power having the stepped-down voltage to the auxiliary battery, and step up an output voltage of the auxiliary battery and then output electric power having the stepped-up voltage to the main battery. The controller is configured to, when the accelerator operation amount has increased, calculate an estimated output value on the basis of a current speed detected by the speed sensor and an amount of increase in the accelerator operation amount. The controller is configured to calculate an output threshold on the basis of the current speed. The controller is configured to, when the estimated output value is larger than the output threshold, control an operation of the DC-DC converter before discharging the main battery in response to an increase in the accelerator operation amount. The controller is configured to calculate a current value on the basis of a difference between the estimated output value and the output threshold, and charge the main battery with electric power output from the auxiliary battery at the current value. The estimated output value is an output value at the time when the main battery is discharged in response to an increase in the accelerator operation amount.

In the above aspect, the controller may be configured to, when the estimated output value is smaller than or equal to the output threshold, discharge the main battery in response to an increase in the accelerator operation amount without charging the main battery with electric power output from the auxiliary battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described.

Figure 1:
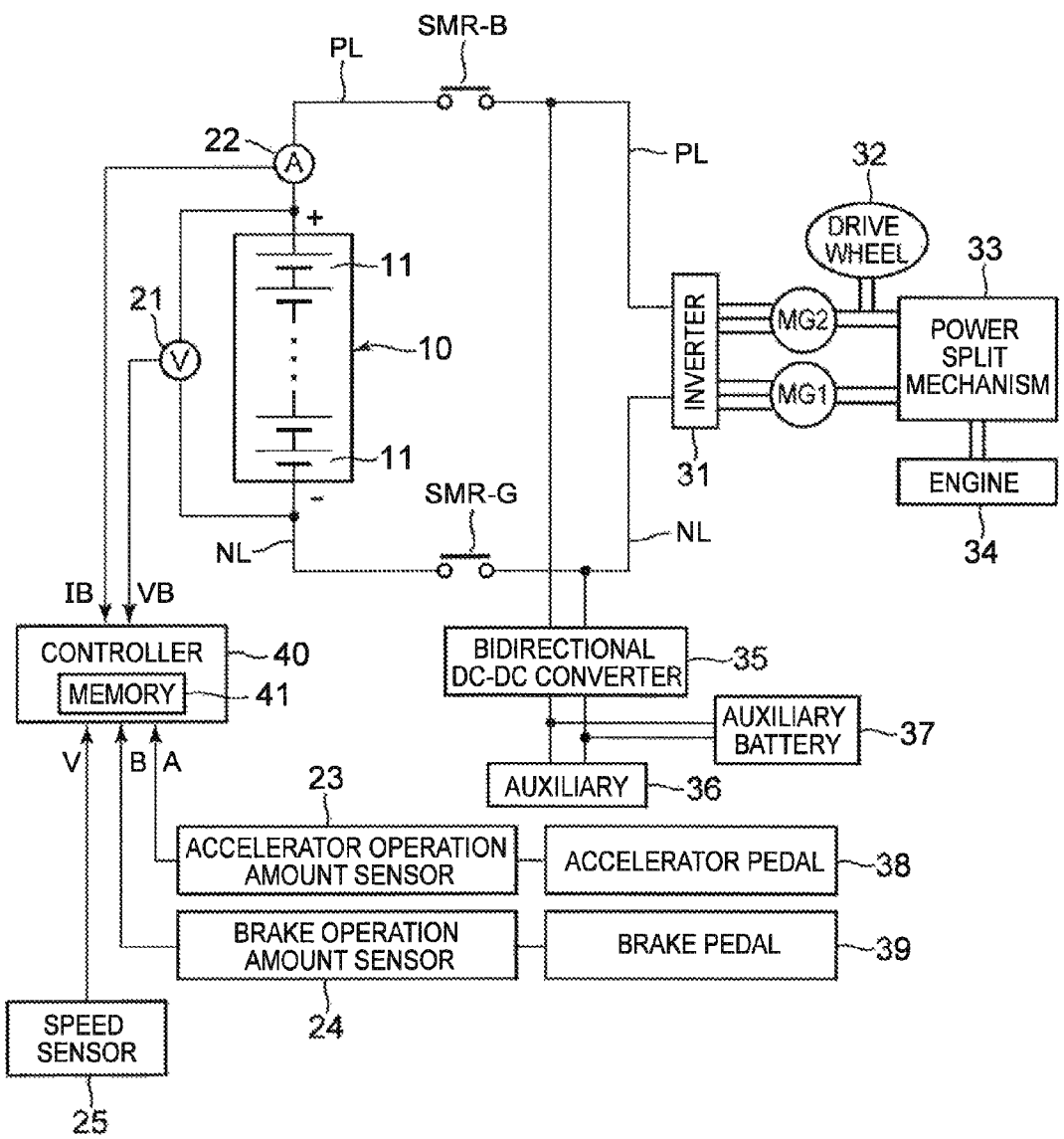
FIG. 1 is a view that shows the configuration of a hybrid system.

FIG. 1 is a view that shows the configuration of a hybrid system according to a first embodiment. The hybrid system shown in FIG. 1 is mounted on a vehicle (so-called hybrid vehicle).

A main battery 10 includes a plurality of single cells 11 connected in series with each other. A nonaqueous electrolyte secondary battery, such as a lithium ion secondary battery, is used as each single cell 11. The main battery 10 may include a plurality of the single cells 11 connected in parallel with each other. A voltage sensor 21 detects the voltage value VB of the main battery 10, and outputs the detected result to a controller 40. An upper limit voltage value and a lower limit voltage value are set for the voltage value VB. The controller 40 controls charging or discharging of the main battery 10 such that the voltage value VB changes within the range between the upper limit voltage value and the lower limit voltage value.

A current sensor 22 detects the current value IB of the main battery 10, and outputs the detected result to the controller 40. The current value IB is a positive value when the main battery 10 is discharged, and the current value IB is a negative value when the main battery 10 is charged.

A positive electrode line PL is connected to the positive electrode terminal of the main battery 10. A negative electrode line NL is connected to the negative electrode terminal of the main battery 10. The main battery 10 is connected to an inverter 31 via the positive electrode line PL and the negative electrode line NL. A system main relay SMR-B is provided in the positive electrode line PL. A system main relay SMR-G is provided in the negative electrode line NL. Each of the system main relays SMR-B, SMR-G switches between an on state and an off state upon reception of a control signal from the controller 40.

When the ignition switch of the vehicle has switched from an off state to an on state, the controller 40 connects the main battery 10 to the inverter 31 by switching each of the system main relays SMR-B, SMR-G from the off state to the on state. Thus, the hybrid system shown in FIG. 1 enters an activated state (ready-on state). When the hybrid system is in the activated state, it is possible to propel the vehicle.

On the other hand, when the ignition switch has switched from the on state to the off state, the controller 40 interrupts the main battery 10 and the inverter 31 from each other by switching each of the system main relays SMR-B, SMR-G from the on state to the off state. Thus, the hybrid system shown in FIG. 1 enters a stopped state (ready-off state). When the hybrid system is in the stopped state, it is not possible to propel the vehicle.

The inverter 31 converts direct-current power, output from the main battery 10, to alternating-current power, and then outputs the alternating-current power to a motor generator MG2. The motor generator MG2 generates kinetic energy (power) for propelling the vehicle upon reception of alternating-current power output from the inverter 31. It is possible to propel the vehicle by transmitting kinetic energy generated by the motor generator MG2 to a drive wheel 32.

A power split mechanism 33 transmits the power of an engine 34 to the drive wheel 32 or a motor generator MG1. The motor generator MG1 generates electric power upon reception of the power of the engine 34. Electric power (alternating-current power) generated by the motor generator MG1 is supplied to the motor generator MG2 or the main battery 10 via the inverter 31. When electric power generated by the motor generator MG1 is supplied to the motor generator MG2, it is possible to drive the drive wheel 32 by using kinetic energy generated by the motor generator MG2. When electric power generated by the motor generator MG1 is supplied to the main battery 10, it is possible to charge the main battery 10.

When the vehicle is decelerated or stopped, the motor generator MG2 converts kinetic energy, which is generated during braking of the vehicle, to electric energy (alternating-current power). The inverter 31 converts alternating-current power, generated by the motor generator MG2, to direct-current power, and then outputs the direct-current power to the main battery 10. Thus, the main battery 10 is allowed to store regenerated electric power. Such braking of the vehicle is called regenerative brake. During braking of the vehicle, only braking force caused by regenerative brake can be generated or not only braking force caused by regenerative brake but also braking force caused by hydraulic brake can be generated.

In the hybrid system according to the present embodiment, a step-up circuit may be provided in a current path between the main battery 10 and the inverter 31. The step-up circuit is able to step up the output voltage of the main battery 10 and then output electric power having the stepped-up voltage to the inverter 31. The step-up circuit is able to step down the output voltage of the inverter 31 and then output electric power having the stepped-down voltage to the main battery 10.

A bidirectional DC-DC converter 35 is connected to the positive electrode line PL between the system main relay SMR-B and the inverter 31 and the negative electrode line NL between the system main relay SMR-G and the inverter 31. An auxiliary 36 and an auxiliary battery 37 are connected to the DC-DC converter 35. For example, a lead storage battery, a nickel-metal hydride battery or a lithium ion secondary battery may be used as the auxiliary battery 37. The auxiliary 36 is connected to the auxiliary battery 37. The auxiliary 36 is able to operate upon reception of electric power output from the auxiliary battery 37.

An upper limit voltage value and a lower limit voltage value are set for the voltage value of the auxiliary battery 37. The controller 40 controls charging or discharging of the auxiliary battery 37 such that the voltage value of the auxiliary battery 37 changes within the range between the upper limit voltage value and the lower limit voltage value. The upper limit voltage value of the auxiliary battery 37 is lower than the lower limit voltage value of the main battery 10. The DC-DC converter 35 steps down the output voltage of the main battery 10 and then outputs electric power having the stepped-down voltage to the auxiliary 36 or the auxiliary battery 37.

By supplying the output electric power of the main battery 10 to the auxiliary 36, it is possible to cause the auxiliary 36 to operate. By supplying the output electric power of the main battery 10 to the auxiliary battery 37, it is possible to charge the auxiliary battery 37. On the other hand, the DC-DC converter 35 steps up the output voltage of the auxiliary battery 37 and then outputs electric power having the stepped-up voltage to the main battery 10. Thus, it is possible to charge the main battery 10 with electric power output from the auxiliary battery 37. The controller 40 controls the operation of the DC-DC converter 35.

An accelerator operation amount sensor 23 detects a depression amount (accelerator operation amount) A from the state where an accelerator pedal 38 is not depressed, and then outputs the detected result to the controller 40. A brake operation amount sensor 24 detects a depression amount (brake operation amount) B from the state where a brake pedal 39 is not depressed, and then outputs the detected result to the controller 40. A speed sensor 25 detects the travel speed (referred to as vehicle speed) V of the vehicle, and then outputs the detected result to the controller 40. For example, a wheel speed sensor is used as the speed sensor 25.

When the accelerator pedal 38 is depressed while the vehicle is stopped, the main battery 10 is discharged in order to cause the vehicle to start traveling (start moving). While the vehicle is traveling by depressing the accelerator pedal 38, when the accelerator pedal 38 is further depressed, the main battery 10 is discharged in order to accelerate the vehicle. On the other hand, when the brake pedal 39 is depressed while the vehicle is traveling, the motor generator MG2 is caused to generate electric power in order to brake the vehicle, and the main battery 10 is charged. When depression of the accelerator pedal 38 has been released as well, the motor generator MG2 is caused to generate electric power, and the main battery 10 is charged.

While the vehicle is traveling, the controller 40 controls charging or discharging of the main battery 10 such that the state of charge (SOC) of the main battery 10 changes in accordance with a target SOC. Information about the target SOC may be stored in a memory 41 of the controller 40. The SOC of the main battery 10 is calculated on the basis of the current value IB or the voltage value VB. A known method may be employed as needed as a method of calculating the SOC.

When the SOC of the main battery 10 is lower than the target SOC, the controller 40 increases the SOC of the main battery 10 toward the target SOC by giving a higher priority to charging of the main battery 10 than to discharging of the main battery 10. On the other hand, when the SOC of the main battery 10 is higher than the target SOC, the controller 40 reduces the SOC of the main battery 10 toward the target SOC by giving a higher priority to discharging of the main battery 10 than to charging of the main battery 10.

When charging or discharging of the main battery 10 is controlled, an upper limit SOC and a lower limit SOC are set in advance. Information about the upper limit SOC and the lower limit SOC may be stored in the memory 41. The upper limit SOC is set in order to prevent overcharging of the main battery 10. The lower limit SOC is set in order to prevent overdischarging of the main battery 10. When the main battery 10 is charged, the controller 40 controls charging of the main battery 10 such that the SOC of the main battery 10 does not become higher than the upper limit SOC. When the main battery 10 is discharged, the controller 40 controls discharging of the main battery 10 such that the SOC of the main battery 10 does not become lower than the lower limit SOC.

Figure 2:
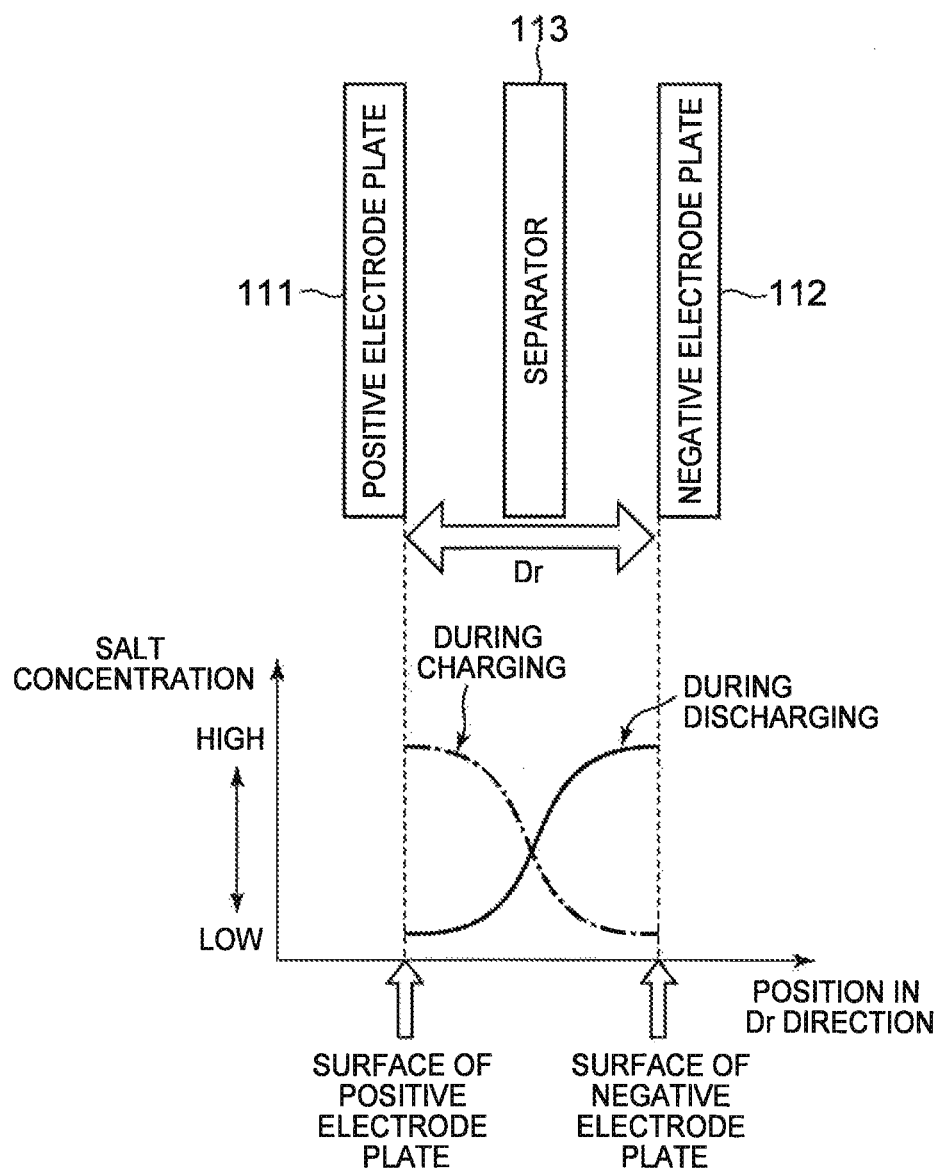
FIG. 2 is a view that shows a salt concentration distribution in a direction in which a positive electrode plate and a negative electrode plate face each other.

Each single cell 11 includes a battery case and a power generating element. The battery case constitutes the outer package of the single cell 11. The power generating element is accommodated in the battery case. As shown in FIG. 2, the power generating element includes a positive electrode plate 111, a negative electrode plate 112 and a separator 113. The separator 113 is arranged between the positive electrode plate 111 and the negative electrode plate 112. The separator 113 is impregnated with electrolytic solution. In FIG. 2, the positive electrode plate 111 and the negative electrode plate 112 are located apart from the separator 113; however, actually, the positive electrode plate 111 and the negative electrode plate 112 are in contact with the separator 113.

Ions migrate in response to charging or discharging of each single cell 11 between the positive electrode plate 111 and the negative electrode plate 112. For example, when a lithium ion secondary battery is used as each single cell 11, lithium ions and electrons are released from the positive electrode plate 111 during charging of each single cell 11, and lithium ions and electrons are absorbed at the negative electrode plate 112. During discharging of each single cell 11, lithium ions and electrons are released from the negative electrode plate 112, and lithium ions and electrons are absorbed at the positive electrode plate 111.

Depending on the charge/discharge state of each single cell 11, a nonuniform salt concentration distribution is developed in a direction in which the positive electrode plate 111 and the negative electrode plate 112 face each other via the separator 113. This salt concentration distribution is shown in FIG. 2. The salt concentration is the concentration of salt in the electrolytic solution. For example, when the lithium ion secondary battery is used as each single cell 11, the salt concentration is the concentration of lithium salt. The salt concentration distribution shown in FIG. 2 shows the salt concentration at each position between the positive electrode plate 111 and the negative electrode plate 112 in the direction in which the positive electrode plate 111 and the negative electrode plate 112 face each other via the separator 113 (the arrow Dr direction shown in FIG. 2).

Within FIG. 2, in the view showing the salt concentration distribution, the ordinate axis represents salt concentration, and the abscissa axis represents position in the arrow Dr direction. One end of the salt concentration distribution shows the salt concentration at the surface of the positive electrode plate 111. The other end of the salt concentration distribution shows the salt concentration at the surface of the negative electrode plate 112. The surface of the positive electrode plate 111 is the face of the positive electrode plate 111, which contacts the separator 113. The surface of the negative electrode plate 112 is the face of the negative electrode plate 112, which contacts the separator 113. In the nonuniform salt concentration distribution shown in FIG. 2, there are variations in salt concentration in accordance with the position in the arrow Dr direction.

When each single cell 11 has been discharged, a nonuniform salt concentration distribution indicated by the continuous line in FIG. 2 is developed. In the salt concentration distribution indicated by the continuous line, the salt concentration at the surface of the negative electrode plate 112 is highest, and the salt concentration at the surface of the positive electrode plate 111 is lowest. The salt concentration decreases from the surface of the negative electrode plate 112 toward the surface of the positive electrode plate 111. In this way, in the salt concentration distribution indicated by the continuous line in FIG. 2, the salt concentration is biased toward the negative electrode plate 112.

When each single cell 11 has been charged, a nonuniform salt concentration distribution indicted by the alternate long and short dashed line in FIG. 2 is developed. In the salt concentration distribution indicated by the alternate long and short dashed line, the salt concentration at the surface of the positive electrode plate 111 is highest, and the salt concentration at the surface of the negative electrode plate 112 is lowest. The salt concentration decreases from the surface of the positive electrode plate 111 toward the surface of the negative electrode plate 112. In this way, in the salt concentration distribution indicated by the alternate long and short dashed line in FIG. 2, the salt concentration is biased toward the positive electrode plate 111.

Figure 3:
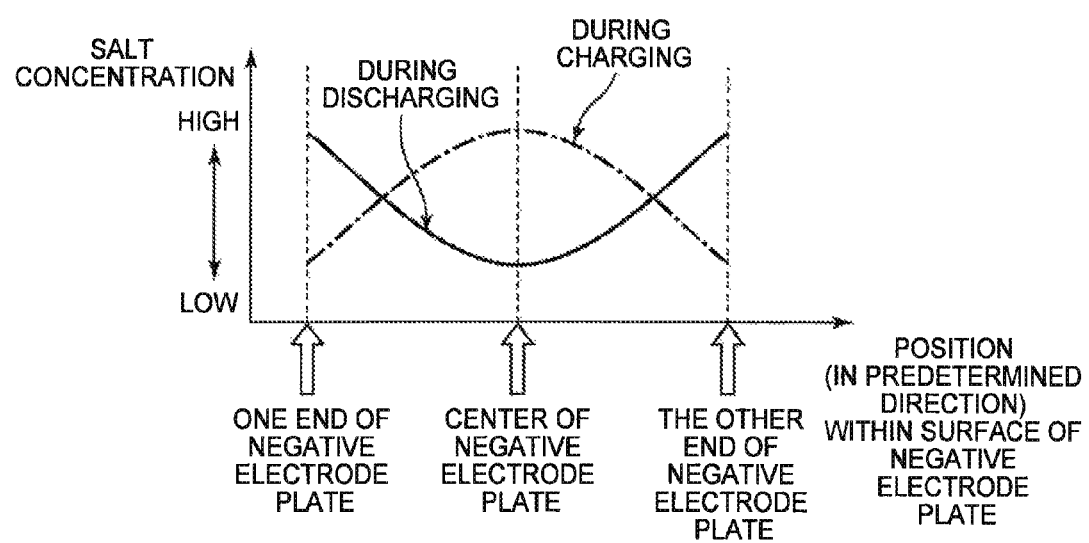
FIG. 3 is a view that shows a salt concentration distribution within the surface of the negative electrode plate.

When the nonuniform salt concentration distribution (the salt concentration distribution indicated by the continuous line or the alternate long and short dashed line) shown in FIG. 2 is developed, a nonuniform salt concentration distribution shown in FIG. 3 is developed within the surface (within the plane) of the negative electrode plate 112. The salt concentration distribution shown in FIG. 3 shows the salt concentration at each position in a predetermined direction within the surface (plane) of the negative electrode plate 112. The predetermined direction is a direction perpendicular to the arrow Dr direction shown in FIG. 2. The salt concentration distribution shown in FIG. 3 shows the salt concentration distribution in the predetermined direction from one end of the negative electrode plate 112 to the other end of the negative electrode plate 112.

When the salt concentration distribution indicated by the continuous line in FIG. 2 is developed, the salt concentration distribution indicated by the continuous line in FIG. 3 is developed. On the other hand, when the salt concentration distribution indicated by the alternate long and short dashed line in FIG. 2 is developed, the salt concentration distribution indicated by the alternate long and short dashed line in FIG. 3 is developed. In the nonuniform salt concentration distribution shown in FIG. 3, there are variations in salt concentration in accordance with the position in the predetermined direction.

As shown in FIG. 3, the salt concentration distribution that is developed within the surface (within the plane) of the negative electrode plate 112 varies depending on whether each single cell 11 is discharged or charged. In the salt concentration distribution that is developed within the surface of the negative electrode plate 112 during discharging of each single cell 11, as indicated by the continuous line in FIG. 3, the salt concentration tends to be lowest at the center of the negative electrode plate 112 in the predetermined direction, and the salt concentration tends to be highest at both ends (one end and the other end) of the negative electrode plate 112 in the predetermined direction. The salt concentration increases from the center of the negative electrode plate 112 toward both ends of the negative electrode plate 112.

On the other hand, in the salt concentration distribution that is developed within the surface of the negative electrode plate 112 during charging of each single cell 11, as indicated by the alternate long and short dashed line in FIG. 3, the salt concentration tends to be highest at the center of the negative electrode plate 112 in the predetermined direction, and the salt concentration tends to be lowest at both ends (one end and the other end) of the negative electrode plate 112 in the predetermined direction. The salt concentration decreases from the center of the negative electrode plate 112 toward both ends of the negative electrode plate 112.

When the nonuniform salt concentration distribution shown in FIG. 3 is developed, the internal resistance value of each single cell 11 increases (that is, each single cell 11 degrades). In other words, when the nonuniform salt concentration distribution shown in FIG. 3 is not developed, it is possible to suppress an increase in the internal resistance value of each single cell 11. In the present embodiment, by controlling charging or discharging of each single cell 11 (main battery 10) in consideration of this point, an increase in the internal resistance value of each single cell 11 is suppressed.

Figure 4:
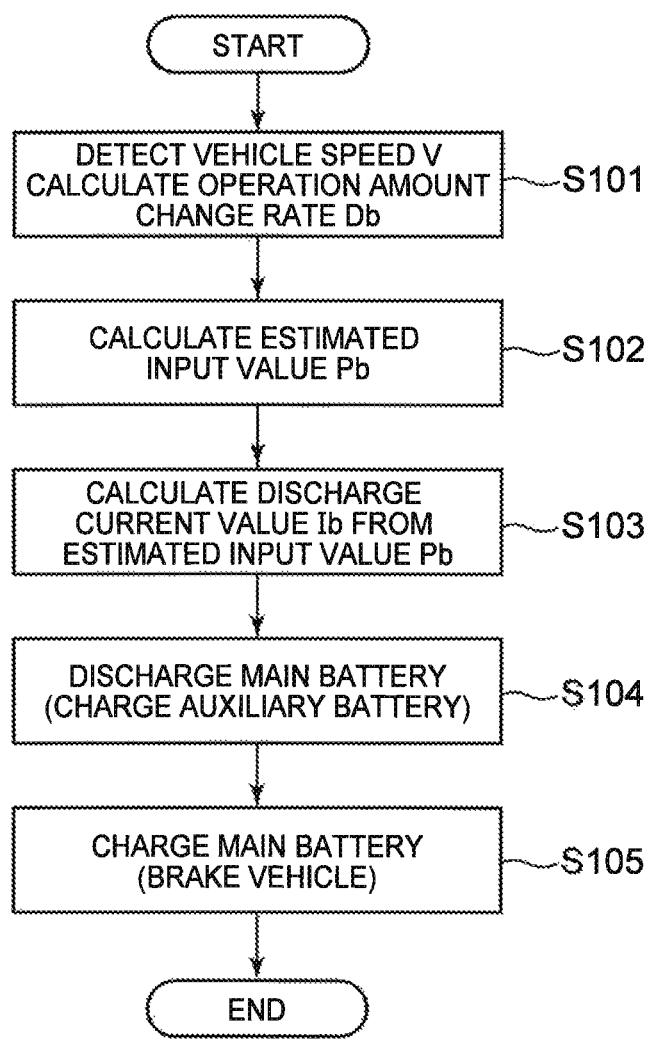
FIG. 4 is a flowchart that shows a process at the time when a brake pedal has been depressed according to a first embodiment.

The process of suppressing an increase in the internal resistance value of each single cell 11 resulting from charging of each single cell 11 (main battery 10) will be described with reference to the flowchart shown in FIG. 4. When the brake pedal 39 has been depressed, in other words, when the brake operation amount B detected by the brake operation amount sensor 24 has increased, the process shown in FIG. 4 is started. The time when the brake pedal 39 has been depressed includes the time when the brake pedal 39 has been depressed from the state where the brake pedal 39 is not depressed and the time when the brake pedal 39 has been further depressed from the state where the brake pedal 39 is depressed.

In step S101, the controller 40 detects the vehicle speed V with the use of the speed sensor 25, and calculates the rate of change Db in the brake operation amount B (referred to as operation amount change rate). The operation amount change rate Db is the amount of change in brake operation amount B within a predetermined time. The process shown in FIG. 4 is started when the brake operation amount B has increased, so the operation amount change rate Db is the amount of increase in brake operation amount B within the predetermined time. The controller 40 is able to calculate the operation amount change rate Db by monitoring the brake operation amount B on the basis of the output of the brake operation amount sensor 24.

In step S102, the controller 40 calculates an estimated input value Pb. The estimated input value Pb is a value obtained by estimating an input to the main battery 10 at the time when braking force caused by regenerative brake is generated, and corresponds to the input electric power (absolute value) of the main battery 10.

The estimated input value Pb is calculated on the basis of the operation amount change rate Db and the vehicle speed V. Specifically, when the correlation (map or arithmetic expression) among the estimated input value Pb, the operation amount change rate Db and the vehicle speed V is obtained in advance, it is possible to calculate the estimated input value Pb from the operation amount change rate Db and the vehicle speed V. The operation amount change rate Db calculated in the process of step S101 and the vehicle speed V detected in the process of step S101 are used as the operation amount change rate Db and the vehicle speed V. Information that indicates the correlation among the estimated input value Pb, the operation amount change rate Db and the vehicle speed V may be stored in the memory 41.

In step S103, the controller 40 calculates a current value Ib on the basis of the estimated input value Pb calculated in the process of step S102. As will be described later, the current value Ib is the current value IB at the time when the main battery 10 is discharged in order to charge the auxiliary battery 37. When the correlation (map or arithmetic expression) between the estimated input value Pb and the current value Ib is obtained in advance, it is possible to calculate the current value Ib from the estimated input value Pb. Information that indicates the correlation between the estimated input value Pb and the current value Ib may be stored in the memory 41.

In step S104, the controller 40 discharges the main battery 10. In order to discharge the main battery 10, electric power discharged from the main battery 10 is supplied to the auxiliary battery 37 to charge the auxiliary battery 37. When the main battery 10 is discharged, the controller 40 controls the operation of the DC-DC converter 35 such that the current value (discharge current value) IB of the main battery 10 becomes the current value Ib calculated in the process of step S103. Discharging of the main battery 10 in the process of step S104 is carried out for a predetermined time.

The predetermined time is set in advance. In the present embodiment, as will be described below, after discharging of the main battery 10 has completed, braking caused by regenerative brake in response to depression of the brake pedal 39 is started. As the predetermined time becomes longer, a time required for braking caused by regenerative brake to start becomes longer, so there is a possibility that drivability decreases. On the other hand, as the predetermined time becomes shorter, a nonuniform salt concentration distribution resulting from charging of each single cell 11 (main battery 10) is easily developed as will be described later. In consideration of this point, the predetermined time is allowed to be set as needed. Information about the predetermined time may be stored in the memory 41. When a time is measured by using a timer, it is possible to charge the auxiliary battery 37 by discharging the main battery 10 only for the predetermined time.

In step S105, the controller 40 carries out braking caused by regenerative brake in response to depression of the brake pedal 39. Specifically, the controller 40 causes the motor generator MG2 to generate electric power, and charges the main battery 10.

In the present embodiment, in braking caused by regenerative brake, when the main battery 10 is charged, the main battery 10 is discharged before the main battery 10 is charged. In braking caused by regenerative brake, when the main battery 10 is charged, a nonuniform salt concentration distribution (the salt concentration distribution indicated by the alternate long and short dashed line in FIG. 2) corresponding to charging of the main battery 10 (each single cell 11) is developed as described with reference to FIG. 2.

As in the case of the present embodiment, when the main battery 10 is discharged in advance at the time when the main battery 10 is charged, it is possible to suppress development of the nonuniform salt concentration distribution (the salt concentration distribution indicated by the alternate long and short dashed line in FIG. 2) corresponding to charging of the main battery 10. If it is possible to suppress development of the nonuniform salt concentration distribution indicated by the alternate long and short dashed line in FIG. 2, it is possible to suppress development of the nonuniform salt concentration distribution indicated by the alternate long and short dashed line in FIG. 3. As a result, it is possible to suppress an increase in the internal resistance value of each single cell 11 (main battery 10).

Figure 5:
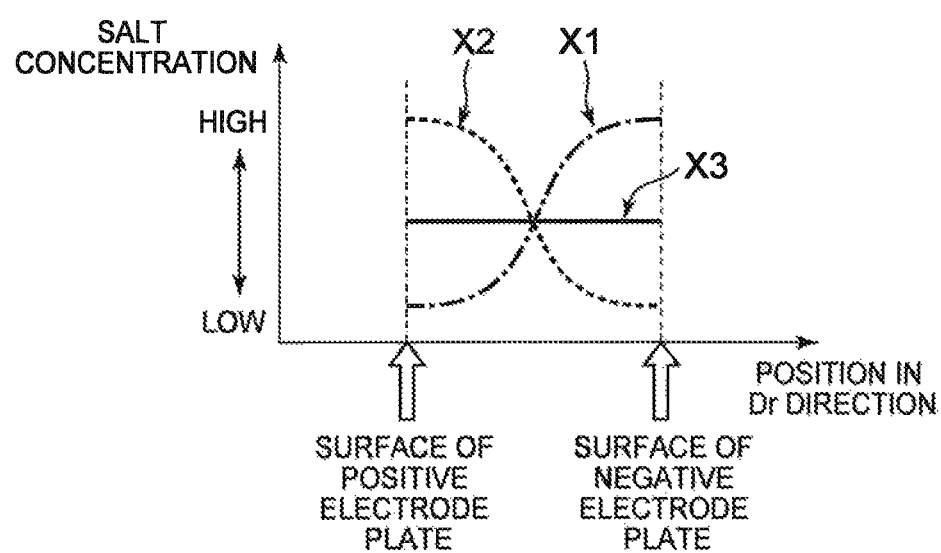
FIG. 5 is a view that illustrates the principle on which a bias of salt concentration resulting from charging of a main battery is suppressed.

This principle will be described with reference to FIG. 5. In the present embodiment, before the main battery 10 is charged, a salt concentration distribution X1 indicated by the alternate long and short dashed line in FIG. 5 is developed as a result of discharging of the main battery 10 (the process of step S104 shown in FIG. 4). FIG. 5 corresponds to FIG. 2, and shows the salt concentration distribution in the arrow Dr direction shown in FIG. 2. The salt concentration distribution X1 shown in FIG. 5 changes with the current value Ib in the process of step S104 shown in FIG. 4 or the time (the above-described predetermined time) during which the process of step S104 is executed.

A salt concentration distribution X2 shown in FIG. 5 is the salt concentration distribution at the time when the main battery 10 is just charged without discharging the main battery 10 in advance. The salt concentration distribution X2 changes with the above-described estimated input value Pb. As is apparent from FIG. 5, the salt concentration distributions X1, X2 are distributions inverted from each other. That is, in the salt concentration distribution X1 shown in FIG. 5, the salt concentration decreases from the surface of the negative electrode plate 112 toward the surface of the positive electrode plate 111; whereas, in the salt concentration distribution X2 shown in FIG. 5, the salt concentration decreases from the surface of the positive electrode plate 111 toward the surface of the negative electrode plate 112.

After the salt concentration distribution X1 shown in FIG. 5 has been developed, when the main battery 10 is charged, it is possible to develop a salt concentration distribution X3 indicated by the continuous line in FIG. 5. In the salt concentration distribution X3, variations in salt concentration, that is, a bias of the salt concentration is suppressed. The salt concentration distribution X3 changes with the salt concentration distributions X1, X2.

When the salt concentration at the surface of the positive electrode plate 111 is reduced by discharging the main battery 10 in advance, even when the salt concentration at the surface of the positive electrode plate 111 increases as a result of charging of the main battery 10, it is possible to suppress an excessive increase in salt concentration at the surface of the positive electrode plate 111 after the main battery 10 has been charged. When the salt concentration at the surface of the negative electrode plate 112 is increased in advance by discharging the main battery 10 in advance, even when the salt concentration at the surface of the negative electrode plate 112 decreases as a result of charging of the main battery 10, it is possible to suppress an excessive decrease in salt concentration at the surface of the negative electrode plate 112 after the main battery 10 has been charged.

As a result, it is possible to develop the salt concentration distribution X3 in which variations in salt concentration are suppressed, and it is possible to suppress development of the salt concentration distribution indicated by the alternate long and short dashed line in FIG. 3. Thus, it is possible to suppress an increase in the internal resistance value of each single cell 11 (main battery 10). If the salt concentration distribution X1 shown in FIG. 5 remains developed, the salt concentration distribution indicated by the continuous line in FIG. 3 is developed, with the result that the internal resistance value of each single cell 11 increases. In the present embodiment, the main battery 10 is charged just after the salt concentration distribution X1 shown in FIG. 5 has been developed, so the salt concentration distribution X1 shown in FIG. 5 does not remain developed, and it is possible to suppress an increase in the internal resistance value of each single cell 11.

In the flowchart shown in FIG. 4, the salt concentration distribution X2 shown in FIG. 5 is acquired by calculating the estimated input value Pb. When the salt concentration distribution X2 is acquired, it is possible to identify the salt concentration distribution X1 for obtaining the salt concentration distribution X3 in which variations in salt concentration are suppressed. As described above, the salt concentration distribution X1 just needs to be a distribution inverted from the salt concentration distribution X2.

The salt concentration distribution X1 depends on the current value Ib at the time when the process of step S104 shown in FIG. 4 is executed or the time (the above-described predetermined time) during which the process of step S104 is executed. The time during which the process of step S104 is executed is determined in advance, so the current value Ib commensurate with the salt concentration distribution X1 just needs to be identified in order to develop the above-described salt concentration distribution X1. In consideration of this point, the correlation between the estimated input value Pb and the current value Ib is allowed to be obtained in advance.

In order to develop the salt concentration distribution X3 shown in FIG. 5, it is required to discharge the main battery 10 at the current value Ib that is calculated from the estimated input value Pb. If the main battery 10 is discharged at an arbitrary current value before charging of the main battery 10 without calculating the current value Ib, there is a concern that variations in salt concentration occur in the salt concentration distribution in the arrow Dr direction.

Specifically, when the main battery 10 has been charged after discharging the main battery 10, there is a case where the salt concentration distribution indicated by the continuous line in FIG. 2 is developed by the influence of the salt concentration distribution during discharging. In this case, the salt concentration distribution indicated by the continuous line in FIG. 3 is developed, with the result that the internal resistance value of each single cell 11 increases. In order to develop the salt concentration distribution X3 shown in FIG. 5, it is required to discharge the main battery 10 at the current value Ib that is calculated from the estimated input value Pb, as in the case of the present embodiment.

In the salt concentration distribution X3 shown in FIG. 5, there are no variations in salt concentration, and the salt concentration is uniform; however, the salt concentration distribution is not limited to the salt concentration distribution X3. In the salt concentration distribution in the arrow Dr direction, unless there are extreme variations in salt concentration (in other words, an extreme bias of the salt concentration), the salt concentration distribution indicated by the alternate long and short dashed line in FIG. 3 is hard to be developed, so the internal resistance value of each single cell 11 is hard to increase. Therefore, in the salt concentration distribution after the process of step S105 shown in FIG. 4 is executed (the salt concentration distribution in the arrow Dr direction), even when there are variations in salt concentration, variations in salt concentration just need to fall within a permissible range. In consideration of this point, the correlation between the estimated input value Pb and the current value Ib is allowed to be obtained in advance.

Figure 6:
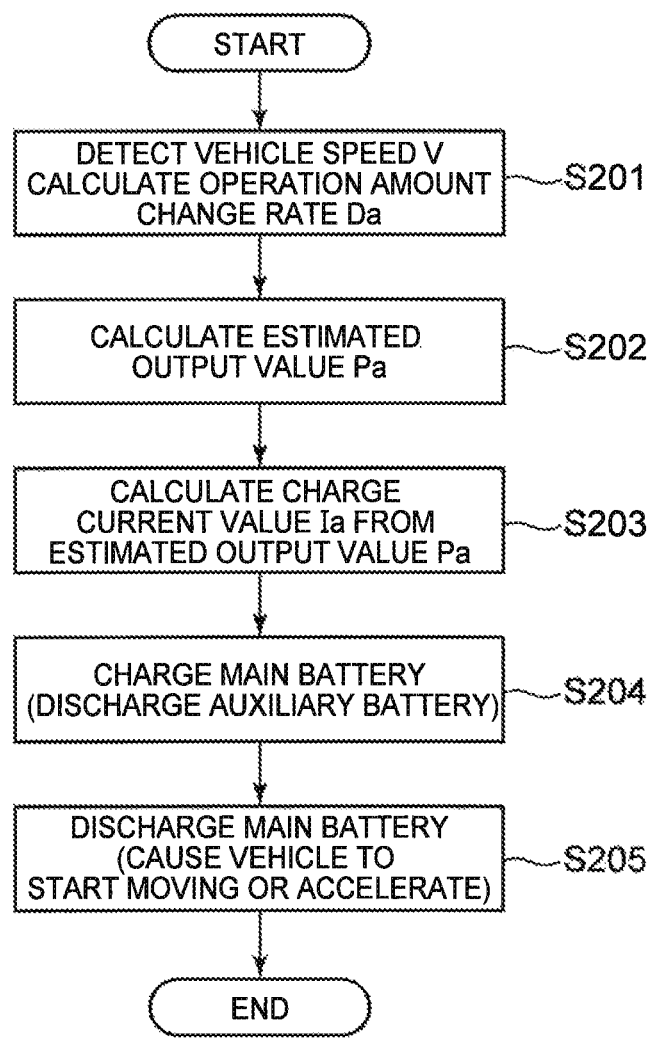
FIG. 6 is a flowchart that shows a process at the time when an accelerator pedal has been depressed according to the first embodiment.

Next, the process of suppressing an increase in the internal resistance value of each single cell 11 resulting from discharging of each single cell 11 (main battery 10) will be described with reference to the flowchart shown in FIG. 6. When the accelerator pedal 38 has been depressed, in other words, when the accelerator operation amount A detected by the accelerator operation amount sensor 23 has increased, the process shown in FIG. 6 is started. The time when the accelerator pedal 38 has been depressed includes the time when the accelerator pedal 38 has been depressed from the state where the accelerator pedal 38 is not depressed and the time when the accelerator pedal 38 has been further depressed from the state where the accelerator pedal 38 is depressed.

In step S201, the controller 40 detects the vehicle speed V with the use of the speed sensor 25, and calculates the rate of change Da in accelerator operation amount A (referred to as operation amount change rate). The operation amount change rate Da is the amount of change in accelerator operation amount A within a predetermined time. The process shown in FIG. 6 is started at the time when the accelerator operation amount A has increased, so the operation amount change rate Da is the amount of increase in accelerator operation amount A within the predetermined time. The controller 40 is able to calculate the operation amount change rate Da by monitoring the accelerator operation amount A on the basis of the output of the accelerator operation amount sensor 23.

In step S202, the controller 40 calculates an estimated output value Pa. The estimated output value Pa is a value obtained by estimating the output of the main battery 10 to the motor generator MG2 within the output that is required of the vehicle, and corresponds to the output electric power of the main battery 10. When the vehicle is caused to start traveling (start moving) by depressing the accelerator pedal 38, only the output of the main battery 10 is used, so the output that is required of the vehicle is equal to the output of the main battery 10.

On the other hand, when the vehicle is accelerated by depressing the accelerator pedal 38, not only the output of the main battery 10 but also the output of the engine 34 is used. That is, the output of the engine 34 increases, and the output of the main battery 10 increases. In this case, part of the output that is required of the vehicle is the output of the main battery 10.

The estimated output value Pa is calculated on the basis of the operation amount change rate Da and the vehicle speed V. Specifically, when the correlation (map or arithmetic expression) among the estimated output value Pa, the operation amount change rate Da and the vehicle speed V is obtained in advance, it is possible to calculate the estimated output value Pa from the operation amount change rate Da and the vehicle speed V. The operation amount change rate Da calculated in the process of step S201 and the vehicle speed V detected in the process of step S201 are used as the operation amount change rate Da and the vehicle speed V. Information that indicates the correlation among the estimated output value Pa, the operation amount change rate Da and the vehicle speed V may be stored in the memory 41.

In step S203, the controller 40 calculates a current value Ia on the basis of the estimated output value Pa calculated in the process of step S202. The current value Ia is the current value IB at the time when the main battery 10 is charged by discharging the auxiliary battery 37 as will be described later. When the correlation (map or arithmetic expression) between the estimated output value Pa and the current value Ia is obtained in advance, it is possible to calculate the current value Ia from the estimated output value Pa. Information that indicates the correlation between the estimated output value Pa and the current value Ia may be stored in the memory 41.

In step S204, the controller 40 charges the main battery 10. In order to charge the main battery 10, the auxiliary battery 37 is discharged, and the electric power discharged from the auxiliary battery 37 is supplied to the main battery 10. When the main battery 10 is charged, the controller 40 controls the operation of the DC-DC converter 35 such that the current value (charge current value) IB of the main battery 10 becomes the current value Ia calculated in the process of step S203. Charging of the main battery 10 accompanying discharging of the auxiliary battery 37 is carried out for a predetermined time.

The predetermined time is set in advance. In the present embodiment, as will be described later, after charging of the main battery 10 accompanying discharging of the auxiliary battery 37 has completed, the vehicle is caused to start traveling (start moving or accelerate) in response to depression of the accelerator pedal 38. As the predetermined time becomes longer, a time required for the vehicle to start traveling (start moving or accelerate) in response to depression of the accelerator pedal 38 becomes longer, so there is a possibility that drivability decreases. On the other hand, as the predetermined time becomes shorter, a nonuniform salt concentration distribution resulting from discharging of each single cell 11 (main battery 10) is easily developed, as will be described later. In consideration of this point, the predetermined time is allowed to be set as needed. Information about the predetermined time may be stored in the memory 41. When a time is measured by using a timer, it is possible to charge the main battery 10 accompanying discharging of the auxiliary battery 37 only for the predetermined time.

In step S205, the controller 40 discharges the main battery 10 in order to cause the vehicle to travel (start moving or accelerate) in response to depression of the accelerator pedal 38. The controller 40 discharges the main battery 10 in order to satisfy the output required of the vehicle.

In the present embodiment, when the main battery 10 is discharged in response to depression of the accelerator pedal 38, the main battery 10 is charged by discharging the auxiliary battery 37 before the main battery 10 is discharged. When the main battery 10 is discharged in response to depression of the accelerator pedal 38, a nonuniform salt concentration distribution (the salt concentration distribution indicated by the continuous line in FIG. 2) corresponding to discharging of the main battery 10 (each single cell 11) is developed as descried with reference to FIG. 2.

As in the case of the present embodiment, when the main battery 10 is charged in advance at the time when the main battery 10 is discharged, it is possible to suppress development of the nonuniform salt concentration distribution (the salt concentration distribution indicated by the continuous line in FIG. 2) corresponding to discharging of the main battery 10. When it is possible to suppress development of the nonuniform salt concentration distribution, indicated by the continuous line in FIG. 2, it is possible to suppress development of the nonuniform salt concentration distribution indicated by the continuous line in FIG. 3. As a result, it is possible to suppress an increase in the internal resistance value of each single cell 11 (main battery 10).

Figure 7:
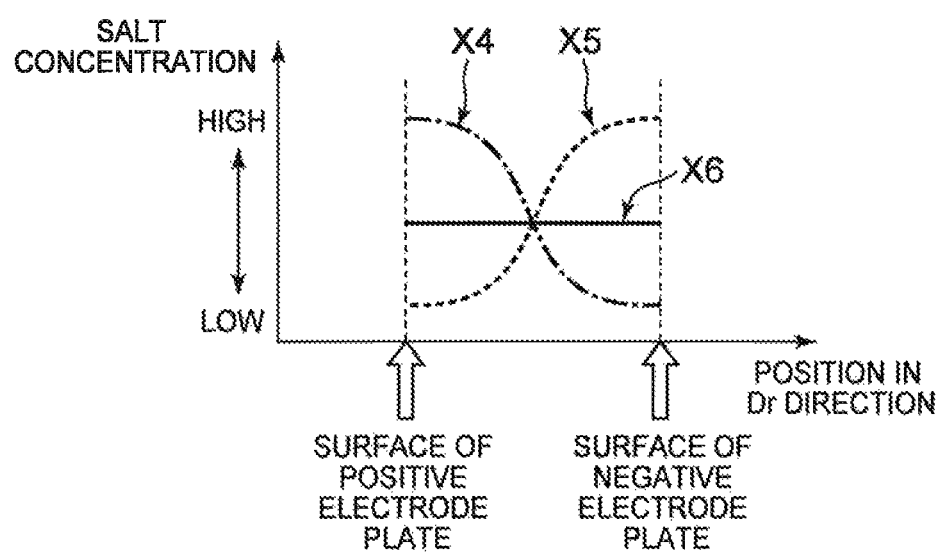
FIG. 7 is a view that illustrates the principle on which a bias of salt concentration resulting from discharging of the main battery is suppressed.

This principle will be described with reference to FIG. 7. In the present embodiment, before the main battery 10 is discharged, a salt concentration distribution X4 indicated by the alternate long and short dashed line in FIG. 7 is developed as a result of charging of the main battery 10 (the process of step S204 shown in FIG. 6) accompanying discharging of the auxiliary battery 37. FIG. 7 corresponds to FIG. 2, and shows the salt concentration distribution in the arrow Dr direction shown in FIG. 2. The salt concentration distribution X4 shown in FIG. 7 changes with the current value Ia in the process of step S204 shown in FIG. 6 or the time (the above-described predetermined time) during which the process of step S204 is executed.

A salt concentration distribution X5 indicated by the dashed line in FIG. 7 is the salt concentration distribution at the time when the main battery 10 is discharged only without charging the main battery 10 in advance. The salt concentration distribution X5 changes with the above-described estimated output value Pa. As is apparent from FIG. 7, the salt concentration distributions X4, X5 are distributions inverted from each other. That is, in the salt concentration distribution X4 shown in FIG. 7, the salt concentration decreases from the surface of the positive electrode plate 111 toward the surface of the negative electrode plate 112; whereas, in the salt concentration distribution X5 shown in FIG. 7, the salt concentration decreases from the surface of the negative electrode plate 112 toward the surface of the positive electrode plate 111.

When the main battery 10 is discharged after the salt concentration distribution X4 shown in FIG. 7 has been developed, it is possible to develop a salt concentration distribution X6 indicated by the continuous line in FIG. 7. In the salt concentration distribution X6, variations in salt concentration, that is, a bias of the salt concentration is suppressed. The salt concentration distribution X6 changes with the salt concentration distributions X4, X5.

When the salt concentration at the surface of the negative electrode plate 112 is reduced by charging the main battery 10 in advance, even when the salt concentration at the surface of the negative electrode plate 112 increases as a result of discharging of the main battery 10, it is possible to suppress an increase in salt concentration at the surface of the negative electrode plate 112 after the main battery 10 has been discharged. When the salt concentration at the surface of the positive electrode plate 111 is increased in advance by charging the main battery 10 in advance, even when the salt concentration at the surface of the positive electrode plate 111 decreases as a result of discharging of the main battery 10, it is possible to suppress an excessive decrease in salt concentration at the surface of the positive electrode plate 111 after the main battery 10 has been discharged.

As a result, it is possible to develop the salt concentration distribution X6 in which variations in salt concentration are suppressed, and it is possible to suppress development of the salt concentration distribution indicated by the continuous line in FIG. 3. Thus, it is possible to suppress an increase in the internal resistance value of each single cell 11 (main battery 10). If the salt concentration distribution X4 shown in FIG. 7 remains developed, the salt concentration distribution indicated by the alternate long and short dashed line in FIG. 3 is developed, with the result that the internal resistance value of each single cell 11 increases. In the present embodiment, the main battery 10 is discharged just after the salt concentration distribution X4 shown in FIG. 7 has been developed, so the salt concentration distribution X4 shown in FIG. 7 does not remain developed, and it is possible to suppress an increase in the internal resistance value of each single cell 11.

In the flowchart shown in FIG. 6, the salt concentration distribution X5 shown in FIG. 7 is acquired by calculating the estimated output value Pa. When the salt concentration distribution X5 is acquired, it is possible to identify the salt concentration distribution X4 for obtaining the salt concentration distribution X6 in which variations in salt concentration are suppressed. As described above, the salt concentration distribution X4 just needs to be a distribution inverted from the salt concentration distribution X5.

The salt concentration distribution X4 depends on the current value Ia at the time when the process of step S204 shown in FIG. 6 is executed or the time (the above-described predetermined time) during which the process of step S204 is executed. The time during which the process of step S204 is executed is determined in advance, so the current value Ia commensurate with the salt concentration distribution X4 just needs to be identified in order to develop the above-described salt concentration distribution X4. In consideration of this point, the correlation between the estimated output value Pa and the current value Ia is allowed to be obtained in advance.

In order to develop the salt concentration distribution X6 shown in FIG. 7, it is required to charge the main battery 10 at the current value Ia that is calculated from the estimated output value Pa. If the main battery 10 is charged at an arbitrary current value before discharging of the main battery 10 without calculating the current value Ia, there is a concern that variations in salt concentration occur in the salt concentration distribution in the arrow Dr direction.

Specifically, when the main battery 10 is discharged after the main battery 10 has been charged, there is a case where the salt concentration distribution indicated by the alternate long and short dashed line in FIG. 2 is developed by the influence of the salt concentration distribution during charging. In this case, the salt concentration distribution indicated by the alternate long and short dashed line in FIG. 3 is developed, with the result that the internal resistance value of each single cell 11 increases. In order to develop the salt concentration distribution X6 shown in FIG. 7, it is required to charge the main battery 10 at the current value Ia that is calculated from the estimated output value Pa, as in the case of the present embodiment.

In the salt concentration distribution X6 shown in FIG. 7, there are no variations in salt concentration, and the salt concentration is uniform; however, the salt concentration distribution is not limited to the salt concentration distribution X6. In the salt concentration distribution in the arrow Dr direction, unless there are extreme variations in salt concentration (in other words, an extreme bias of the salt concentration), the salt concentration distribution indicated by the continuous line in FIG. 3 is hard to be developed, so the internal resistance value of each single cell 11 is hard to increase. Therefore, in the salt concentration distribution after the process of step S205 shown in FIG. 6 is executed (the salt concentration distribution in the arrow Dr direction), even when there are variations in salt concentration, variations in salt concentration just need to fall within a permissible range. In consideration of this point, the correlation between the estimated output value Pa and the current value Ia is allowed to be obtained in advance.

In the present embodiment, the processes shown in FIG. 4 and FIG. 6 are executed; however, processes are not limited to those processes. That is, only the process shown in FIG. 4 may be executed or only the process shown in FIG. 6 may be executed. When only the process shown in FIG. 4 is executed, the DC-DC converter 35 does not need to be the bidirectional DC-DC converter 35. That is, the DC-DC converter 35 just needs to step down the output voltage of the main battery 10 and then output electric power having the stepped-down voltage to the auxiliary battery 37.

A second embodiment of the invention will be described. In the present embodiment, like reference numerals denote the same components as the components described in the first embodiment, and the detailed description thereof is omitted. Hereinafter, the difference from the first embodiment will be mainly described.

Even when the main battery 10 is charged in response to braking caused by regenerative brake, the internal resistance value of each single cell 11 (main battery 10) may not increase depending on the salt concentration distribution (the salt concentration distribution in the arrow Dr direction shown in FIG. 2) that is developed as a result of the charging. As long as the internal resistance value of each single cell 11 does not increase, it is not required to discharge the main battery 10 before charging the main battery 10. In this case, in the salt concentration distribution in the arrow Dr direction shown in FIG. 2, variations in salt concentration (in other words, a bias of the salt concentration) are allowed.

Figure 8:
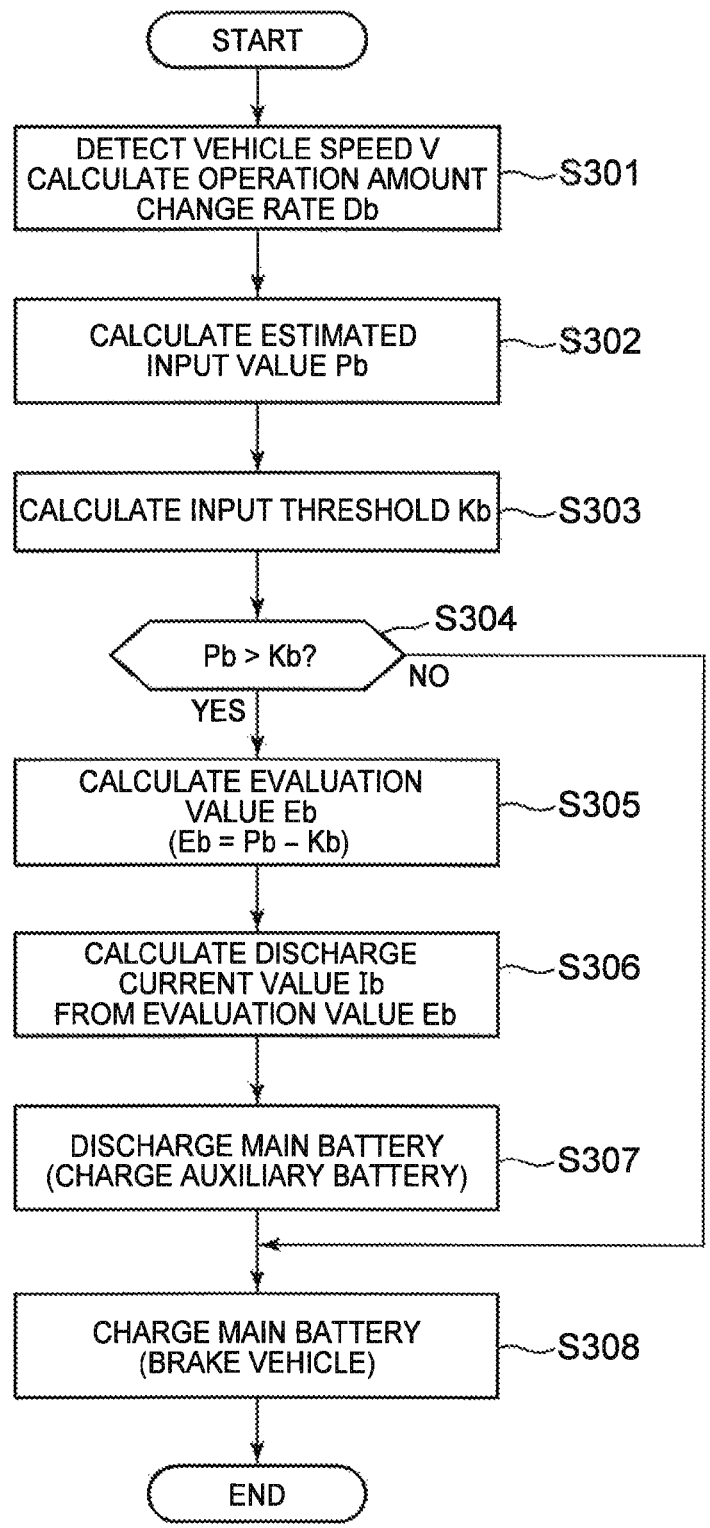
FIG. 8 is a flowchart that shows a process at the time when the brake pedal has been depressed according to a second embodiment.

In the present embodiment, the above-described point is considered. The process according to the present embodiment will be described with reference to FIG. 8. The flowchart shown in FIG. 8 corresponds to the flowchart shown in FIG. 4. When the brake pedal 39 has been depressed, in other words, when the brake operation amount B detected by the brake operation amount sensor 24 has increased, the process shown in FIG. 8 is started.

The processes of step S301 and step S302 are the same as the processes of step S101 and step S102 shown in FIG. 4. In step S303, the controller 40 calculates an input threshold Kb. The input threshold Kb is a value that is set in order to allow variations in salt concentration as described above, and is a threshold for the estimated input value Pb.

Figure 9:
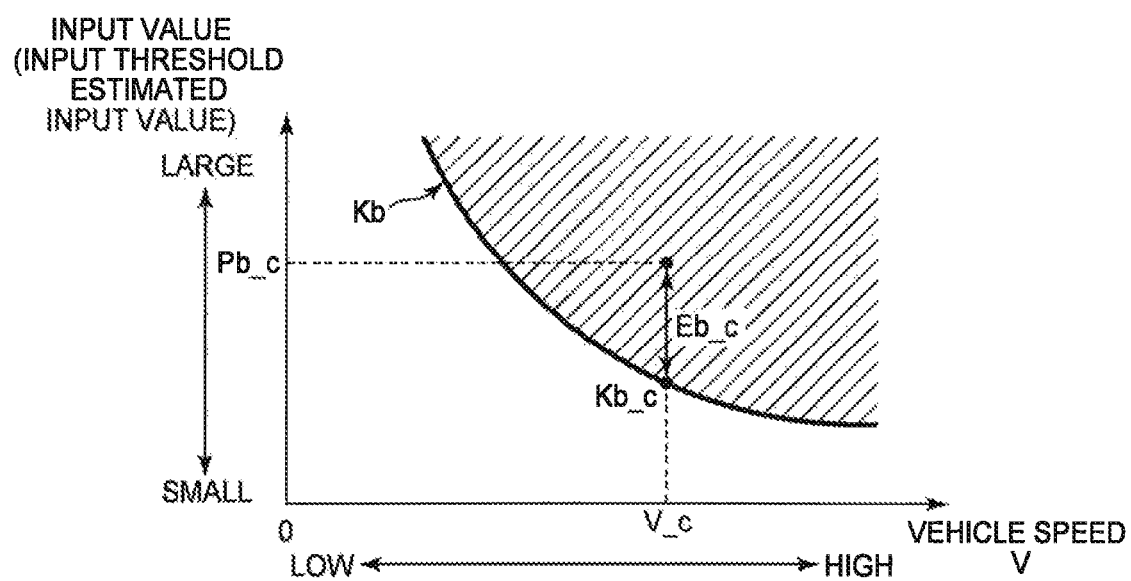
FIG. 9 is a graph that shows the correlation between an input value (an estimated input value and an input threshold) and a vehicle speed according to the second embodiment.

The input threshold Kb is calculated on the basis of the vehicle speed V. Specifically, as shown in FIG. 9, when the correlation (map or arithmetic expression) between the input threshold Kb and the vehicle speed V is determined in advance, it is possible to calculate the input threshold Kb from the vehicle speed V. Information that indicates the correlation between the input threshold Kb and the vehicle speed V may be stored in the memory 41.

In the example shown in FIG. 9, as the vehicle speed V increases, the input threshold Kb decreases. In other words, as the vehicle speed V decreases, the input threshold Kb increases. A vehicle speed V_c shown in FIG. 9 is the vehicle speed V detected in the process of step S301. An input threshold Kb_c shown in FIG. 9 is the input threshold Kb corresponding to the vehicle speed V_c.

In step S304, the controller 40 determines whether the estimated input value Pb calculated in the process of step S302 is larger than the input threshold Kb calculated in the process of step S303. When the estimated input value Pb is smaller than or equal to the input threshold Kb, the controller 40 proceeds to the process of step S308.

On the other hand, when the estimated input value Pb is larger than the input threshold Kb, the controller 40 calculates an evaluation value Eb in step S305. The evaluation value Eb is a value obtained by subtracting the input threshold Kb calculated in the process of step S303 from the estimated input value Pb calculated in the process of step S302. Because the estimated input value Pb is larger than the input threshold Kb, the evaluation value Eb is larger than 0.

In the process of step S302, the estimated input value Pb is calculated on the basis of the operation amount change rate Db and the vehicle speed V. FIG. 9 shows the estimated input value Pb_c corresponding to the vehicle speed V_c. In the example shown in FIG. 9, the estimated input value Pb_c is larger than the input threshold Kb_c. Depending on the vehicle speed V and the operation amount change rate Db, the estimated input value Pb can be smaller than or equal to the input threshold Kb.

In step S306, the controller 40 calculates the current value Ib on the basis of the evaluation value Eb calculated in the process of step S305. The current value Ib is the current value IB at the time when the main battery 10 is discharged in order to charge the auxiliary battery 37. When the correlation (map or arithmetic expression) between the evaluation value Eb and the current value Ib is obtained in advance, it is possible to calculate the current value Ib from the evaluation value Eb. Information that indicates the correlation between the evaluation value Eb and the current value Ib may be stored in the memory 41. The processes of step S307 and step S308 are the same as the processes of step S104 and step S105 shown in FIG. 4. However, in the process of step S307, the controller 40 controls the operation of the DC-DC converter 35 such that the current value (discharge current value) IB of the main battery 10 becomes the current value Ib calculated in the process of step S306.

In the present embodiment, as well as the first embodiment, when the main battery 10 is charged, by discharging the main battery 10 in advance, it is possible to suppress development of the nonuniform salt concentration distribution (the salt concentration distribution indicated by the alternate long and short dashed line in FIG. 2 or FIG. 3) after the main battery 10 has been charged and to suppress development of an increase in the internal resistance value of each single cell 11.

On the other hand, in the present embodiment, when the estimated input value Pb is smaller than or equal to the input threshold Kb, the process of step S308 is executed without executing the processes of step S305 to step S307 shown in FIG. 8. At this time, if the main battery 10 is charged on the basis of the process of step S308, variations in salt concentration (in other words, a bias of the salt concentration) may occur in the salt concentration distribution in the arrow Dr direction shown in FIG. 2. In the present embodiment, within the range in which it is possible to suppress an increase in the internal resistance value of each single cell 11, the input threshold Kb is set in order to allow variations in salt concentration. Therefore, even when the process of step S308 is executed without executing the processes of step S305 to step S307, it is possible to suppress an increase in the internal resistance value of each single cell 11.

When it is possible to suppress an increase in the internal resistance value of each single cell 11, it is not required to execute the processes of step S305 to step S307 shown in FIG. 8. In the present embodiment, when the estimated input value Pb is smaller than or equal to the input threshold Kb, the process of step S308 is executed without executing the processes of step S305 to step S307. Thus, when the brake pedal 39 has been depressed, it is possible to start braking of the vehicle in response to depression of the brake pedal 39 without ensuring a time to execute the processes of step S305 to step S307, so drivability is more easily ensured.

When the estimated input value Pb falls within the diagonally shaded area in FIG. 9 (excluding the line that defines the input threshold Kb), the estimated input value Pb is larger than the input threshold Kb, and the processes of step S305 to step S307 shown in FIG. 8 are executed. On the other hand, when the estimated input value Pb is located on the line that defines the input threshold Kb shown in FIG. 9 or falls outside the diagonally shaded area in FIG. 9, the estimated input value Pb is smaller than or equal to the input threshold Kb, and the processes of step S305 to step S307 shown in FIG. 8 are not executed.

A third embodiment of the invention will be described. In the present embodiment, like reference numerals denote the same components as the components described in the first embodiment, and the detailed description thereof is omitted. Hereinafter, the difference from the first embodiment will be mainly described.

Even when the main battery 10 is discharged in response to depression of the accelerator pedal 38, the internal resistance value of each single cell 11 (main battery 10) may not increase depending on the salt concentration distribution (the salt concentration distribution in the arrow Dr direction in FIG. 2) that is developed as a result of the discharging. As long as the internal resistance value of each single cell 11 does not increase, it is not required to charge the main battery 10 before discharging the main battery 10. In this case, in the salt concentration distribution in the arrow Dr direction shown in FIG. 2, variations in salt concentration (in other words, a bias of the salt concentration) are allowed.

Figure 10:
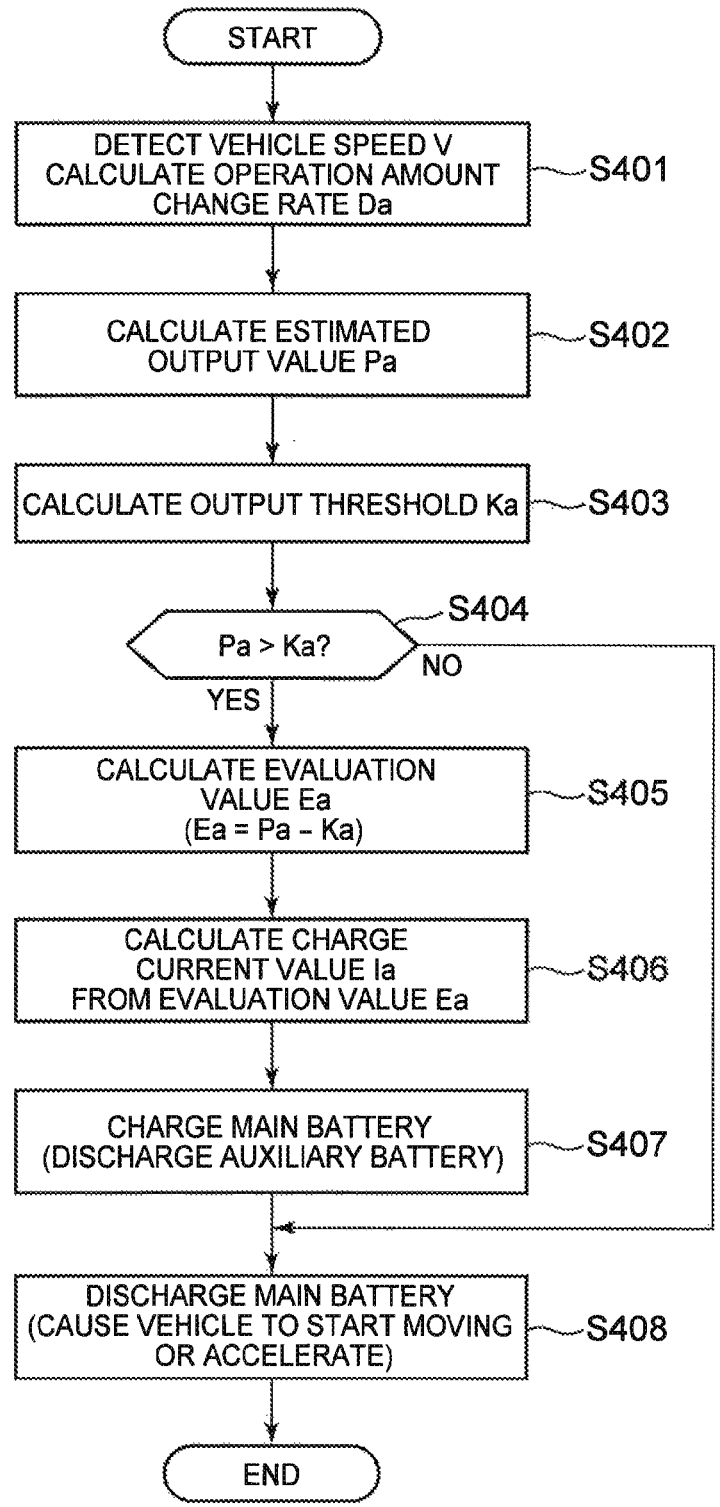
FIG. 10 is a flowchart that shows a process at the time when the accelerator pedal has been depressed according to a third embodiment.

In the present embodiment, the above-described point is considered. The process according to the present embodiment will be described with reference to FIG. 10. The flowchart shown in FIG. 10 corresponds to the flowchart shown in FIG. 6. When the accelerator pedal 38 has been depressed, in other words, when the accelerator operation amount A detected by the accelerator operation amount sensor 23 has increased, the process shown in FIG. 10 is started.

The processes of step S401 and step S402 are the same as the processes of step S201 and step S202 shown in FIG. 6. In step S403, the controller 40 calculates an output threshold Ka. The output threshold Ka is a value that is set in order to allow variations in salt concentration as described above, and is a threshold for the estimated output value Pa.

Figure 11:
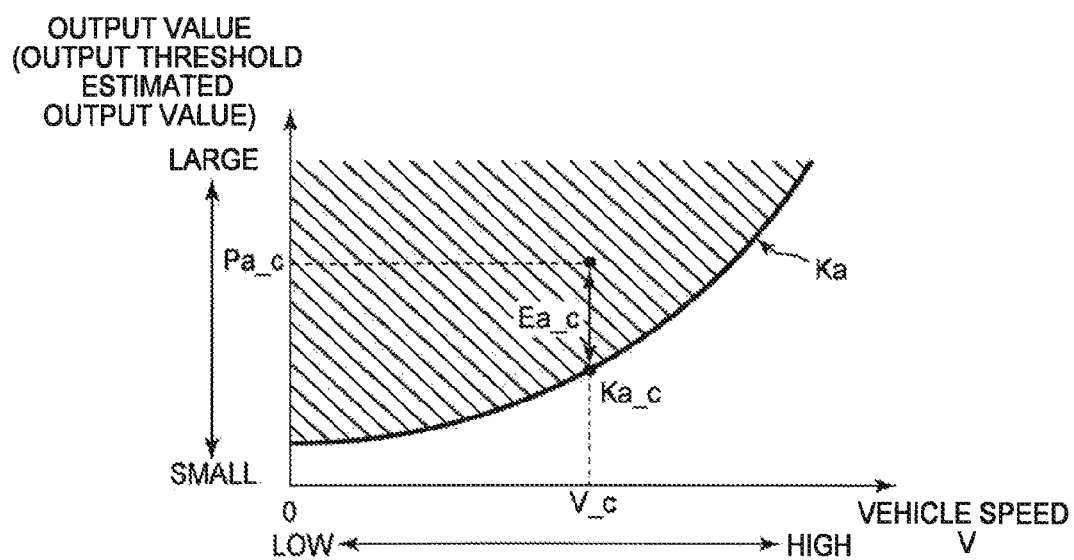
FIG. 11 is a graph that shows the correlation between an output value (an estimated output value and an output threshold) and a vehicle speed according to the third embodiment.

The output threshold Ka is calculated on the basis of the vehicle speed V. Specifically, as shown in FIG. 11, when the correlation (map or arithmetic expression) between the output threshold Ka and the vehicle speed V is determined in advance, it is possible to calculate the output threshold Ka from the vehicle speed V. Information that indicates the correlation between the output threshold Ka and the vehicle speed V may be stored in the memory 41.

In the example shown in FIG. 11, as the vehicle speed V increases, the output threshold Ka increases. In other words, as the vehicle speed V decreases, the output threshold Ka decreases. A vehicle speed V_c shown in FIG. 11 is the vehicle speed V detected in the process of step S401. An output threshold Ka_c shown in FIG. 11 is the output threshold Ka corresponding to the vehicle speed V_c.

In step S404, the controller 40 determines whether the estimated output value Pa calculated in the process of step S402 is larger than the output threshold Ka calculated in the process of step S403. When the estimated output value Pa is smaller than or equal to the output threshold Ka, the controller 40 proceeds to the process of step S408.

On the other hand, when the estimated output value Pa is larger than the output threshold Ka, the controller 40 calculates an evaluation value Ea in step S405. The evaluation value Ea is a value obtained by subtracting the output threshold Ka calculated in the process of step S403 from the estimated output value Pa calculated in the process of step S402. Because the estimated output value Pa is larger than the output threshold Ka, the evaluation value Ea is larger than 0.

In the process of step S402, the estimated output value Pa is calculated on the basis of the operation amount change rate Da and the vehicle speed V. FIG. 11 shows an estimated output value Pa_c corresponding to the vehicle speed V_c. In the example shown in FIG. 11, the estimated output value Pa_c is larger than the output threshold Ka_c. Depending on the vehicle speed V and the operation amount change rate Da, the estimated output value Pa can be smaller than or equal to the output threshold Ka.

In step S406, the controller 40 calculates the current value Ia on the basis of the evaluation value Ea calculated in the process of step S405. The current value Ia is the current value IB at the time when the main battery 10 is charged by discharging the auxiliary battery 37. When the correlation (map or arithmetic expression) between the evaluation value Ea and the current value Ia is obtained in advance, it is possible to calculate the current value Ia from the evaluation value Ea. Information that indicates the correlation between the evaluation value Ea and the current value Ia may be stored in the memory 41. The processes of step S407 and step S408 are the same as the processes of step S204 and step S205 shown in FIG. 6. However, in the process of step S407, the controller 40 controls the operation of the DC-DC converter 35 such that the current value (charge current value) IB of the main battery 10 becomes the current value Ia calculated in the process of step S406.

In the present embodiment, as well as the first embodiment, when the main battery 10 is discharged, by charging the main battery 10 in advance, it is possible to suppress development of the nonuniform salt concentration distribution (the salt concentration distribution indicated by the continuous line in FIG. 2 or FIG. 3) after the main battery 10 has been discharged and to suppress development of an increase in the internal resistance value of each single cell 11.

On the other hand, in the present embodiment, when the estimated output value Pa is smaller than or equal to the output threshold Ka, the process of step S408 is executed without executing the processes of step S405 to step S407 shown in FIG. 10. At this time, if the main battery 10 is discharged on the basis of the process of step S408, variations in salt concentration (in other words, a bias of the salt concentration) may occur in the salt concentration distribution in the arrow Dr direction shown in FIG. 2. In the present embodiment, within the range in which it is possible to suppress an increase in the internal resistance value of each single cell 11, the output threshold Ka is set in order to allow variations in salt concentration. Therefore, even when the process of step S408 is executed without executing the processes of step S405 to step S407, it is possible to suppress an increase in the internal resistance value of each single cell 11.

When it is possible to suppress an increase in the internal resistance value of each single cell 11, it is not required to execute the processes of step S405 to step S407. In the present embodiment, when the estimated output value Pa is smaller than or equal to the output threshold Ka, the process of step S408 is executed without executing the processes of step S405 to step S407. Thus, when the accelerator pedal 38 has been depressed, it is possible to cause the vehicle to start traveling (start moving or accelerate) in response to depression of the accelerator pedal 38 without ensuring a time to execute the processes of step S405 to step S407, so drivability is more easily ensured.

When the estimated output value Pa falls within the diagonally shaded area in FIG. 11 (excluding the line that defines the input threshold Ka), the estimated output value Pa is larger than the output threshold Ka, and the processes of step S405 to step S407 shown in FIG. 10 are executed. On the other hand, when the estimated output value Pa is located on the line that defines the output threshold Ka shown in FIG. 11 or falls outside the diagonally shaded area in FIG. 11, the estimated output value Pa is smaller than or equal to the output threshold Ka, and the processes of step S405 to step S407 shown in FIG. 10 are not executed.

According to the first aspect of the invention, by discharging the main battery before charging the main battery, it is possible to suppress development of an increase in the internal resistance value of the main battery (that is, degradation of the main battery). Because the main battery is a nonaqueous electrolyte secondary battery, a bias of salt concentration in an electrolyte is developed as a result of discharging or charging. The internal resistance value of the main battery increases because of the bias of the salt concentration.

A bias of the salt concentration at the time when the main battery has been discharged and a bias of the salt concentration at the time when the main battery has been charged are inverted from each other. When the main battery is discharged in advance before the main battery is charged, it is possible to cancel a bias of the salt concentration that is developed during charging by a bias of the salt concentration that is developed during discharging, so it is possible to suppress development of a bias of the salt concentration after the main battery has been charged. Thus, it is possible to suppress an increase in the internal resistance value of the main battery because of a bias of the salt concentration. In order to cancel a bias of the salt concentration that is developed during charging by a bias of the salt concentration that is developed during discharging, it is required to discharge the main battery at the current value that is calculated on the basis of the estimated input value.

In the second aspect of the invention as well, a similar advantageous effect to that of the first aspect of the invention is obtained. Even when a bias of the salt concentration is allowed, the internal resistance value of the main battery may not increase. In the second aspect of the invention, in order to allow a bias of the salt concentration, the input threshold is set in advance, and, when the estimated input value is larger than the input threshold, the main battery is discharged before charging the main battery. When the main battery is discharged at the current value that is calculated on the basis of the difference between the estimated input value and the input threshold, it is possible to bring a bias of the salt concentration after the main battery has been charged into a permissible range.

In the second aspect of the invention, when the estimated input value is smaller than or equal to the input threshold, the main battery may be charged in response to an increase in brake operation amount without discharging the main battery for charging the auxiliary battery. When the estimated input value is smaller than or equal to the input threshold, a bias of the salt concentration after the main battery has been charged falls within the permissible range. In this case, it is not required to discharge the main battery before charging the main battery. Thus, it is possible to charge the main battery in response to an increase in brake operation amount without ensuring a time to discharge the main battery.

According to the third aspect of the invention, by charging the main battery before discharging the main battery, it is possible to suppress an increase in the internal resistance value of the main battery (that is, degradation of the main battery). Because the main battery is a nonaqueous electrolyte secondary battery, a bias of salt concentration in an electrolyte is developed as a result of discharging or charging. The internal resistance value of the main battery increases because of the bias of the salt concentration.

A bias of the salt concentration at the time when the main battery has been discharged and a bias of the salt concentration at the time when the main battery has been charged are inverted from each other. When the main battery is charged in advance before the main battery is discharged, it is possible to cancel a bias of the salt concentration that is developed during discharging by a bias of the salt concentration that is developed during charging, so it is possible to suppress development of a bias of the salt concentration after the main battery has been discharged. Thus, it is possible to suppress an increase in the internal resistance value of the main battery because of a bias of the salt concentration. In order to cancel a bias of the salt concentration that is developed during discharging by a bias of the salt concentration that is developed during charging, it is required to charge the main battery at the current value that is calculated on the basis of the estimated output value.

In the fourth aspect of the invention as well, a similar advantageous effect to that of the third aspect of the invention is obtained. Even when a bias of the salt concentration is allowed, the internal resistance value of the main battery may not increase. In the fourth aspect of the invention, in order to allow a bias of the salt concentration, the output threshold is set in advance, and, when the estimated output value is larger than the output threshold, the main battery is charged before discharging the main battery. When the main battery is charged at the current value that is calculated on the basis of the difference between the estimated output value and the output threshold, it is possible to bring a bias of the salt concentration after the main battery has been discharged into a permissible range.

In the fourth aspect of the invention, when the estimated output value is smaller than or equal to the output threshold, the main battery may be discharged in response to an increase in accelerator operation amount without charging the main battery with electric power output from the auxiliary battery. When the estimated output value is smaller than or equal to the output threshold, a bias of the salt concentration after the main battery has been discharged falls within a permissible range. In this case, it is not required to charge the main battery before discharging the main battery. Thus, it is possible to discharge the main battery in response to an increase in accelerator operation amount without ensuring a time to charge the main battery.

What is claimed is:
1. A vehicle comprising:
   a main battery including a nonaqueous electrolyte secondary battery;
   a motor generator configured to
      generate energy for propelling the vehicle upon reception of electric power output from the main battery, and
      generate electric power during braking of the vehicle and then output the generated electric power to the main battery;
   a brake pedal;
   a brake operation amount sensor configured to detect a brake operation amount, the brake operation amount being an operation amount of the brake pedal;
   a speed sensor configured to detect a speed of the vehicle;
   an auxiliary battery configured to supply electric power to an auxiliary;
   a DC-DC converter configured to
      step down an output voltage of the main battery, and then output electric power having the stepped-down voltage to the auxiliary battery; and
   a controller configured to
      when the brake operation amount has increased, calculate an estimated input value on the basis of a current speed detected by the speed sensor and an amount of increase in the brake operation amount, control an operation of the DC-DC converter before charging the main battery in response to an increase in the brake operation amount, calculate a current value on the basis of the estimated input value, and discharge the main battery for charging the auxiliary battery at the current value, the estimated input value being an input value at the time when the main battery is charged with electric power generated by the motor generator in response to an increase in the brake operation amount.

2. A vehicle comprising:

a main battery including a nonaqueous electrolyte secondary battery;

a motor generator configured to generate energy for propelling the vehicle upon reception of electric power output from the main battery, and generate electric power during braking of the vehicle and then output the generated electric power to the main battery;

a brake pedal;

a brake operation amount sensor configured to detect a brake operation amount, the brake operation amount being an operation amount of the brake pedal;

a speed sensor configured to detect a speed of the vehicle;

an auxiliary battery configured to supply electric power to an auxiliary;

a DC-DC converter configured to step down an output voltage of the main battery, and then output electric power having the stepped-down voltage to the auxiliary battery; and a controller configured to when the brake operation amount has increased, calculate an estimated input value on the basis of a current speed detected by the speed sensor and an amount of increase in the brake operation amount, calculate an input threshold on the basis of the current speed, when the estimated input value is larger than the input threshold, control an operation of the DC-DC converter before the main battery is charged in response to an increase in the brake operation amount, calculate a current value on the basis of a difference between the estimated input value and the input threshold, and discharge the main battery for charging the auxiliary battery at the current value, the estimated input value being an input value at the time when the main battery is charged with electric power generated by the motor generator in response to an increase in the brake operation amount.

3. The vehicle according to claim 2, wherein the controller is configured to, when the estimated input value is smaller than or equal to the input threshold, the main battery is charged in response to an increase in the brake operation amount without discharging the main battery for charging the auxiliary battery.

4. A vehicle comprising:

a main battery including a nonaqueous electrolyte secondary battery, the main battery being configured to output energy for propelling the vehicle;

an accelerator pedal;

an accelerator operation amount sensor configured to detect an accelerator operation amount, the accelerator operation amount being an operation amount of the accelerator pedal;

a speed sensor configured to detect a speed of the vehicle;

an auxiliary battery configured to supply electric power to an auxiliary;

a DC-DC converter configured to step down an output voltage of the main battery, and then output electric power having the stepped-down voltage to the auxiliary battery, and step up an output voltage of the auxiliary battery, and then output electric power having the stepped-up voltage to the main battery; and a controller configured to when the accelerator operation amount has increased, calculate an estimated output value on the basis of a current speed detected by the speed sensor and an amount of increase in the accelerator operation amount, control an operation of the DC-DC converter before discharging the main battery in response to an increase in the accelerator operation amount, calculate a current value on the basis of the estimated output value, and charge the main battery with electric power output from the auxiliary battery at the current value, the estimated output value being an output value at the time when the main battery is discharged in response to an increase in the accelerator operation amount.

5. A vehicle comprising:

a main battery including a nonaqueous electrolyte secondary battery, the main battery being configured to output energy for propelling the vehicle;

an accelerator pedal;

an accelerator operation amount sensor configured to detect an accelerator operation amount, the accelerator operation amount being an operation amount of the accelerator pedal;

a speed sensor configured to detect a speed of the vehicle;

an auxiliary battery configured to supply electric power to an auxiliary;

a DC-DC converter configured to step down an output voltage of the main battery, and then output electric power having the stepped-down voltage to the auxiliary battery, and step up an output voltage of the auxiliary battery, and then output electric power having the stepped-up voltage to the main battery; and a controller configured to when the accelerator operation amount has increased, calculate an estimated output value on the basis of a current speed detected by the speed sensor and an amount of increase in the accelerator operation amount, calculate an output threshold on the basis of the current speed, when the estimated output value is larger than the output threshold, control an operation of the DC-DC converter before discharging the main battery in response to an increase in the accelerator operation amount, calculate a current value on the basis of a difference between the estimated output value and the output threshold, and charge the main battery with electric power output from the auxiliary battery at the current value, the estimated output value being an output value at the time when the main battery is discharged in response to an increase in the accelerator operation amount.

6. The vehicle according to claim 5, wherein the controller is configured to, when the estimated output value is smaller than or equal to the output threshold, discharge the main battery in response to an increase in the accelerator operation amount without charging the main battery with electric power output from the auxiliary battery.

* * * * *